US006170694B1

United States Patent
Munari

(10) Patent No.: US 6,170,694 B1
(45) Date of Patent: Jan. 9, 2001

(54) TWO-PART HANDLE FOR A COOKING VESSEL

(75) Inventor: Marco Munari, Cardano Al Campo (IT)

(73) Assignee: La Termoplastic F.B.M. S.R.L. (IT)

( * ) Notice: Under 35 U.S.C. 154(b), the term of this patent shall be extended for 0 days.

(21) Appl. No.: 09/435,780

(22) Filed: Nov. 8, 1999

(30) Foreign Application Priority Data

May 10, 1999 (EP) .................................................. 99830284

(51) Int. Cl.[7] .................................................. B65D 25/28
(52) U.S. Cl. .................................................. 220/753; 220/755
(58) Field of Search .................................................. 220/753, 752, 220/755, 573.1

(56) References Cited

U.S. PATENT DOCUMENTS

| 2,133,252 | * | 10/1938 | Moore et al. | 220/753 X |
| 2,231,222 | * | 2/1941 | Rosenheimer, Jr. | 220/755 |
| 5,025,939 | * | 6/1991 | Bunn et al. | 220/752 X |
| 5,279,443 | * | 1/1994 | Koda et al. | 220/755 X |

FOREIGN PATENT DOCUMENTS

| 195 06 419 | 3/1996 | (DE) . |
| 195 13 245 | 10/1996 | (DE) . |
| 0241410 | 10/1987 | (EP) . |
| 0808600 | 11/1997 | (EP) . |
| 2030846 | 4/1980 | (GB) . |

OTHER PUBLICATIONS

European Search Report dated Jan. 25, 2000.

* cited by examiner

*Primary Examiner*—Steven Pollard
(74) *Attorney, Agent, or Firm*—Liniak, Berenato, Longacre & White

(57) ABSTRACT

A handle for a cooking vessel, wherein a body, made of thermosetting material, has a through inner cavity between two opposite boundary surfaces of the body; and the cavity is fitted through with an insert made of thermoplastic material and having click-on fastening means for reversibly connecting the insert to the body.

7 Claims, 2 Drawing Sheets

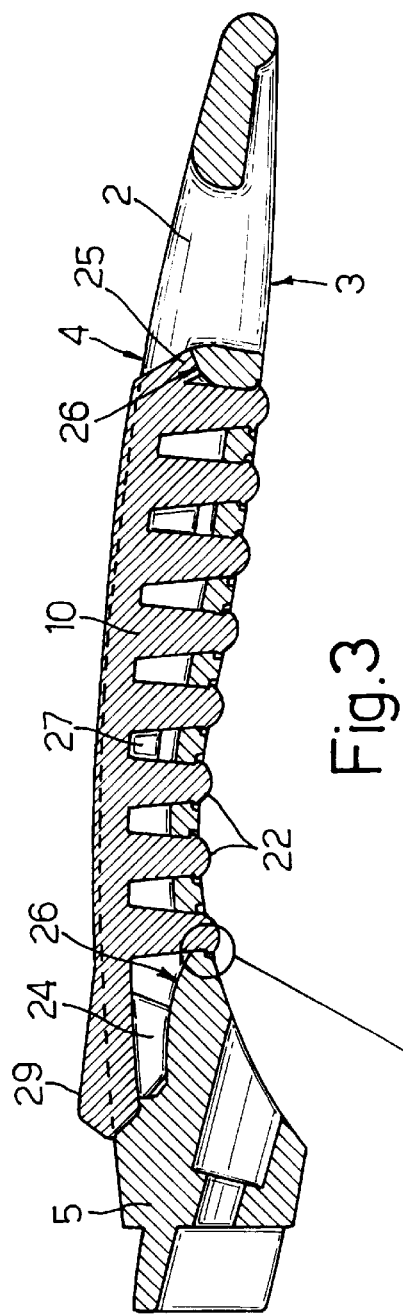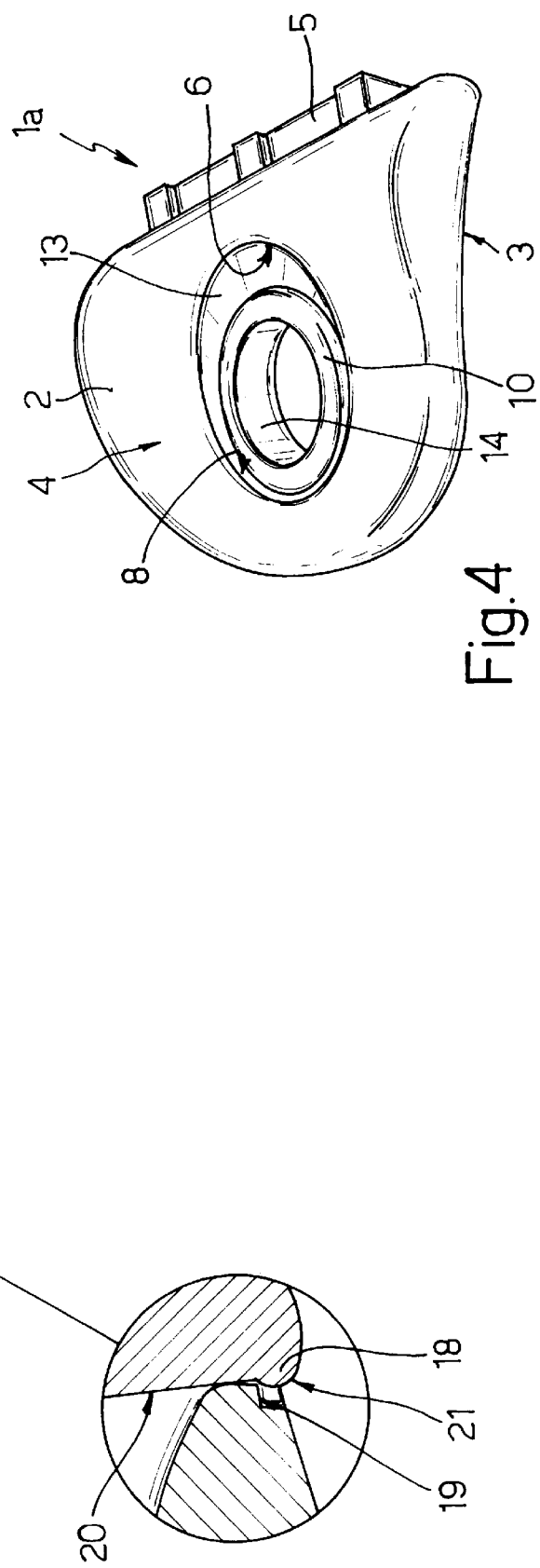

TWO-PART HANDLE FOR A COOKING VESSEL

The present invention relates to a perfected handle for a cooking vessel, and which is particularly suitable for manufacture using two different materials to achieve aesthetic and functional forms not otherwise achievable using materials normally employed for the purpose.

BACKGROUND OF THE INVENTION

Cooking vessels (saucepans, frying-pans, etc.) are normally fitted with handles to enable the vessels to be gripped easily, even when hot; for which purpose, the best handles are obviously those with good thermal insulation properties.

Some known handles are made from thermosetting polymer materials, e.g. filled phenol-formaldehyde resins: though good thermal insulators, such materials have poor mechanical characteristics, are not easy to work into complex shapes, cannot be coloured as required, and are therefore poorly suited to the manufacture of handles with predetermined functional or aesthetic characteristics (e.g. mechanical strength, form and colour). Moreover, as is well known, such materials have a tendency to deteriorate in appearance, especially as a result of frequent washing.

Other handles are known in which a part made of phenol-formaldehyde resin (or other similar thermosetting material) is covered with or fitted to a part made of thermoplastic material, the well-known, favourable properties of which may thus be exploited to achieve any shape or colour of the thermoplastic part. This, however, poses the further problem of ensuring firm connection of parts made of different, normally incompatible materials. Handles, for example, are known in which a sheath of thermoplastic material is fitted over and secured to a core of thermosetting material using appropriate fastening means (screws or rivets). The thermoplastic sheath is also known—e.g. European Patent Application EP-A-808600—to be co-molded directly onto the thermosetting-resin part.

Besides requiring specially designed additional components (the fastening elements), mechanically connecting the two (phenol-formaldehyde-resin and thermoplastic) parts obviously also involves a fairly long assembly process, both of which result in an increase in overall production cost. Moreover, should the user wish to separate the parts made of different materials, e.g. to wash them differently, this involves yet another relatively painstaking operation, providing, of course, reversible fastening means (e.g. screws) have been used. On the other hand, co-molding two materials of substantially different physical and chemical characteristics calls for accurate control of the molding process, is a complex, relatively high-cost operation, is poorly suited to the formation of highly complex shapes, and obviously precludes any possibility of separating the two parts made of different materials.

SUMMARY OF THE INVENTION

It is an object of the present invention to provide a handle for a cooking vessel, designed to eliminate the aforementioned drawbacks typically associated with known handles. In particular, it is an object of the invention to provide a handle which is cheap and easy to produce, provides for a wide range of shapes, colours, colour combinations and designs in general, and at the same time is highly functional, strong, long-lasting and of good thermal insulation properties.

According to the present invention, there is provided a handle for a cooking vessel, the handle comprising a body made of a first material and having a first and a second boundary surface opposite and substantially facing each other, and an end portion having connecting means for connection to a cooking vessel; characterized by also comprising at least one through inner cavity between said opposite first and second boundary surfaces of said body; at least one corresponding insert made of a second material and fitted through said at least one through inner cavity with respective opposite ends located at said opposite first and second boundary surfaces of the body; and click-on fastening means for fastening said at least one insert inside said at least one through inner cavity.

The handle according to the present invention is therefore cheap and easy to produce; requires no complex co-molding or complex, time-consuming assembly operations; may be made in a wide range of designs, and in particular countless shapes, colours or colour combinations; and is at the same time highly functional, strong, long-lasting and of good thermal insulation properties. Moreover, the parts made of different materials may not only be assembled quickly and easily but also separated just as quickly and easily for appropriate cleaning/washing.

BRIEF DESCRIPTION OF THE DRAWINGS

A number of non-limiting embodiments of the present invention will be described by way of example with reference to the accompanying drawings, in which:

FIG. 3 shows, with a larger-scale detail, a section along line III—III in FIG. 2;

FIG. 4 shows a second embodiment of the handle according to the invention.

DETAILED DESCRIPTION OF THE INVENTION

Figure 1:
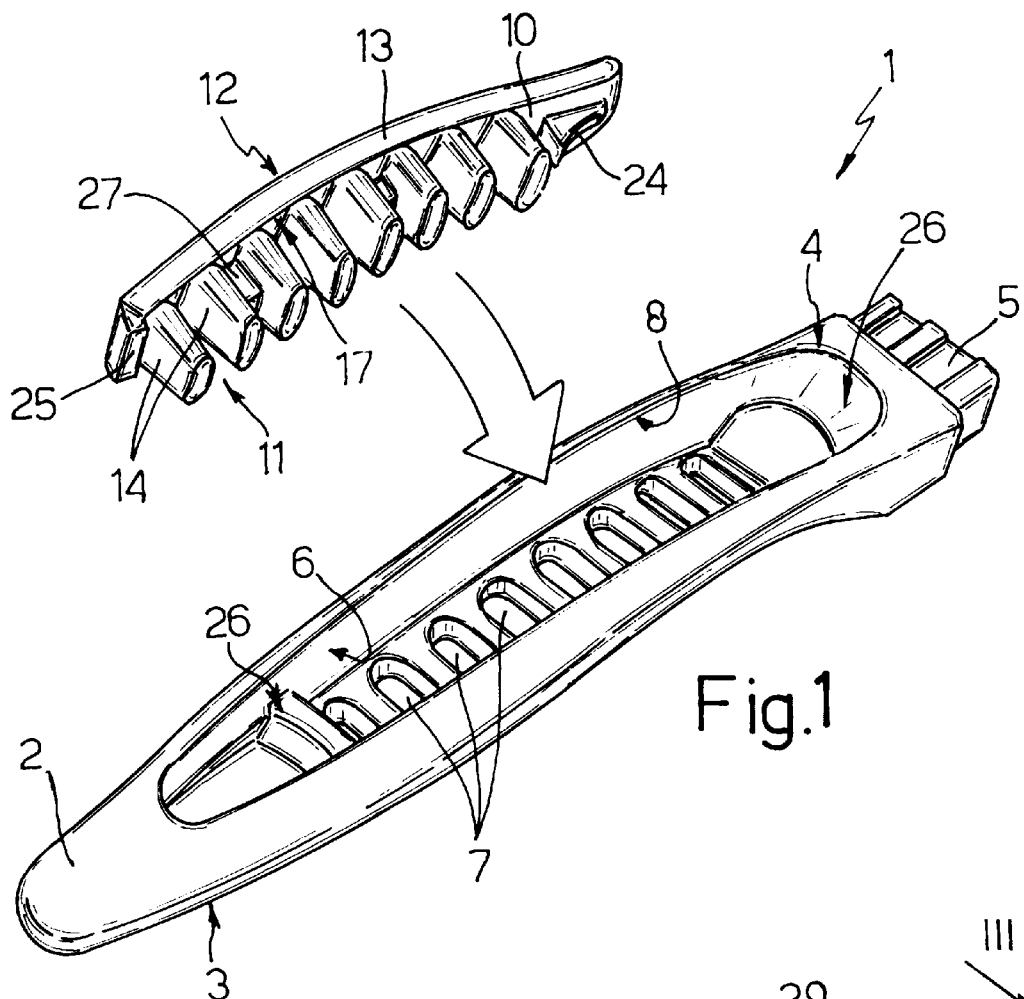
FIG. 1 shows an exploded view in perspective of a first embodiment of a handle for a cooking vessel in accordance with the present invention.
Figure 2:
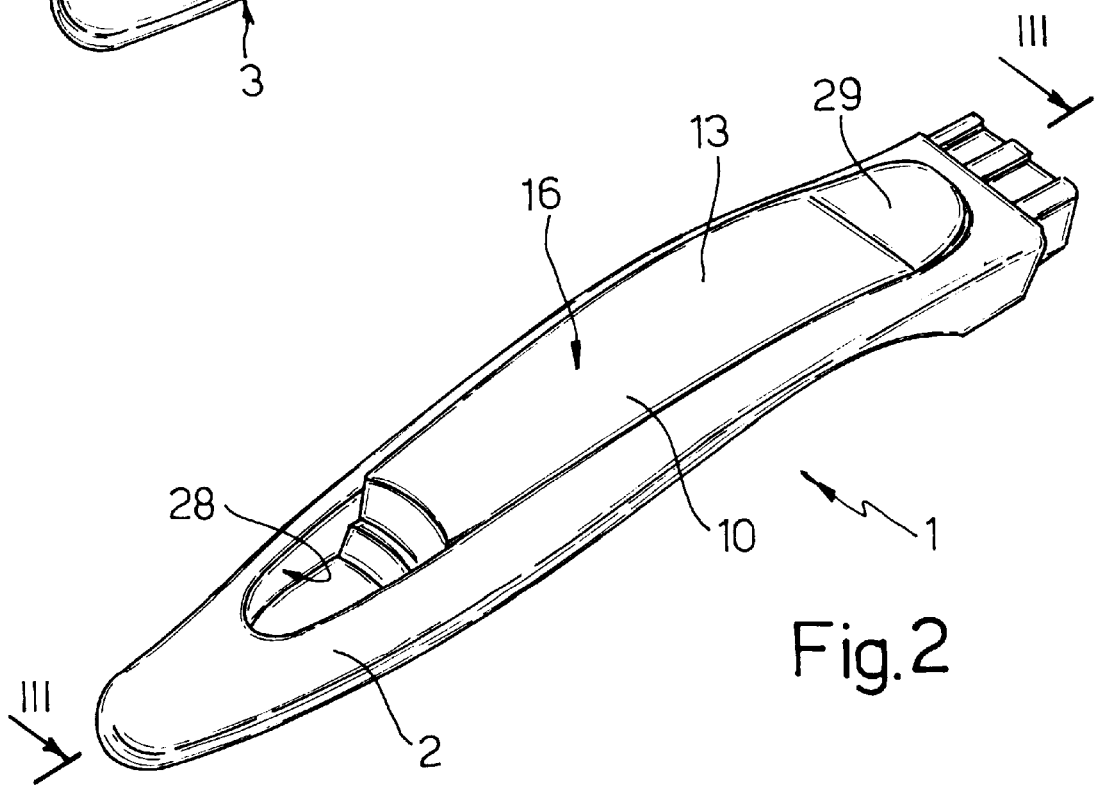
FIG. 2 shows a view in perspective of the FIG. 1 handle as assembled.

With reference to FIGS. 1 to 3, a handle 1 for a cooking vessel (of any known type not shown) comprises a body 2 advantageously made of a thermosetting polymer material, e.g. a filled phenol-formaldehyde resin of good thermal insulation properties and traditionally used for making cooking vessel handles. Though longitudinally elongated in the purely non-limiting example shown in FIGS. 1 to 3, handle 1 according to the present invention may obviously be of any shape.

However shaped, body 2 comprises two opposite, facing boundary surfaces 3, 4—in the example shown, a bottom and top boundary surface respectively; and a respective end portion 5 having connecting means for connection to a substantially known cooking vessel (e.g. having a through hole for insertion of a respective fastening screw).

Body 2 comprises a through inner cavity 6 between opposite boundary surfaces 2, 3: in particular, body 2 comprises a number of separate first openings 7 in (bottom) boundary surface 3, and one continuous opening 8 in (top) boundary surface 4, all of which are connected internally to one another to form through cavity 6. Cavity 6 houses an insert 10 preferably made of thermoplastic polymer material and fitted through cavity 6 with respective opposite ends 11, 12 located at opposite boundary surfaces 3, 4 of body 2.

In the example shown, insert 10 comprises a visible portion 13 at end 12, and a number of fastening portions 14 at end 11. In particular, visible portion 13 is defined by a curved shaped plate inserted inside continuous opening 8 in boundary surface 4 of body 2 and having an outer surface 16 blending with boundary surface 4; and fastening portions 14, e.g. defined by respective transverse ribs inserted through openings 7 in boundary surface 3, project from a face 17, opposite outer surface 16, of visible portion 13.

Each of fastening portions 14 has at least one retaining tooth 18 which engages a corresponding seat 19 formed in body 2, close to boundary surface 3 of the body. For example, as shown in detail in FIG. 3, retaining teeth 18 are defined by respective feet projecting from respective walls 20 of fastening portions 14, and corresponding seats 19 are defined by respective steps formed in boundary surface 3 of body 2. Each tooth 18 preferably comprises a rounded front edge 21 which, together with the limited amount of elastic deformability of the material from which insert 10 is made, enables tooth 18 to click easily into respective seat 19. A retaining tooth 18 may, of course, be provided on only one of fastening portions 14 (e.g. the one closest to end portion 5 of handle 1), just as each fastening portion 14 may comprise a number of retaining teeth 18.

Fastening portions 14 preferably extend beyond boundary surface 3 of body 2 to define, on boundary surface 3 of body 2, a succession of transverse convex projections 22 enabling easy grip of handle 1 by the user.

At opposite longitudinal ends of visible portion 13, insert 10 comprises a first and a second contact portion 24, 25, which rest on corresponding inner surfaces 26 of cavity 6 when retaining 18 teeth engage respective seats 19. In the example shown, contact portions 24, 25 also project from face 17 of visible portion 13, and extend parallel to and are shorter than fastening portions 14; and further contact portions 27 may be formed between the transverse ribs defining fastening portions 14.

Body 2 may also comprise a through hole 28 possibly communicating with cavity 6 but not occupied by insert 10, and by which to hang handle 1. Insert 10, as also body 2 and cavity 6, may of course be of any shape: in particular, insert 10 may be so shaped as to comprise, for example, a slope 29 projecting from outer surface 16 to define a support for the user's finger.

Body 2 and insert 10 are manufactured separately from the desired materials. In particular, as stated, body 2 may advantageously be made of thermosetting polymer material (such as filled phenol-formaldehyde resin), and insert 10 from a thermoplastic polymer material, which may easily be formed into any shape (including underside recesses, cavities, projections, etc.) and of any colour (with practically no limitation). Insert 10 is then fitted to body 2—by means of a fast, straightforward click-on operation by virtue of the presence of teeth 18 and respective seats 19—in the correct position ensured by contact portions 24, 25 and eventually 27 mating with respective inner surfaces 26 of cavity 6.

FIG. 4, in which any details similar or identical to those already described are indicated using the same reference numbers, shows a possible variation of the handle according to the present invention: a handle 1a, in particular for a saucepan, again comprises a body 2 made of thermosetting material and having a through cavity 6 between two opposite boundary surfaces 3, 4 (in the example shown, a bottom and top boundary surface respectively), and a known end portion 5 for connection to a cooking vessel.

In this case, body 2 comprises one opening 8 in (top) boundary surface 4, and one opening 7 in (bottom) boundary surface 3, both of which openings define cavity 6 which, in this case also, is fitted through with an insert 10 made of thermoplastic polymer material. Though not shown in detail for the sake of simplicity, insert 10 again comprises a visible portion 13 inserted inside continuous opening 8 in boundary surface 4; and a fastening portion 14 having at least one retaining tooth 18, e.g. advantageously defined by a circumferential projection engaging a respective annular seat 19 formed in boundary surface 3 (and equivalent in all respects to that shown in the FIG. 3 section).

What is claimed is:

1. A handle (1) for a cooking vessel, the handle comprising a body (2) made of a first material and at least one corresponding insert (10) made of a second material; said body (2) having a first and a second boundary surface (3, 4) opposite and substantially facing each other and an end portion (5) having connecting means for connection to a cooking vessel; the handle being characterized in that:

i) said body (2) is made of a thermosetting polymer material and said at least one insert (10) is made of a thermoplastic polymer material;

ii) said body (2) is provided with at least one through inner cavity (6) between said opposite first and second boundary surfaces (3, 4) of said body (2);

iii) said at least one corresponding insert (10) is fitted through said at least one through inner cavity (6) with respective opposite ends (11, 12) located at said opposite first and second boundary surfaces (3, 4) of the body (2);

iv) the handle further comprises click-on fastening means (18, 19) for fastening said at least one insert (10) inside said at least one through inner cavity (6); said click-on fastening means comprising at least one retaining tooth (18) carried by said at least one insert (10) and a corresponding seat (19) formed in said body (2).

2. A handle as claimed in claim 1, characterized in that said at least one retaining tooth (18) is carried at a first end (11) of said at least one insert (10) located at said first boundary surface (3) of said body (2); said corresponding seat (19) being formed in said body (2), close to said first boundary surface (3) of the body.

3. A handle as claimed in claim 2, characterized in that said at least one insert (10) comprises a visible portion (13), and at least one fastening portion (14) fitted through said at least one cavity (6) and having at least one corresponding retaining tooth (18); said at least one fastening portion (14) extending from said visible portion (13) and through said cavity (6) so that said at least one retaining tooth (18) projects outwards of said cavity.

4. A handle as claimed in claim 3, characterized in that said at least one through inner cavity (6) of said body (2) comprises at least one first opening (7) formed in said first boundary surface (3) and in which is inserted at least one corresponding fastening portion (14) of said at least one insert (10) having at least one corresponding retaining tooth (18); and one continuous second opening (8) formed in said second boundary surface (4) and in which is inserted said visible portion (13) of said at least one insert (10).

5. A handle as claimed in claim 4, characterized in that said first boundary surface (3) comprises a number of separate first openings (7) connected internally to one another and to said continuous second opening (8) to form said at least one through inner cavity (6) for the insertion of said at least one insert (10); said at least one insert (10) comprising a number of fastening portions (14) projecting from said visible portion (13) and inserted through said first openings (7).

6. A handle as claimed in claim 1, characterized in that said at least one insert (10) comprises at least one contact portion (24, 25, 27) which rests on a corresponding inner surface (26) of said at least one through inner cavity (6) when said at least one retaining tooth (18) engages said corresponding seat (19).

7. A handle as claimed in claim 1, characterized in that said at least one retaining tooth (18) is defined by a feet projecting from a wall (20) of a respective fastening portions (14) of said insert (10); said feet presenting a rounded front edge (21) which, together with the limited amount of elastic deformability of said thermoplastic polymer material from which insert (10) is made, enables said tooth (18) to click into said respective seat (19).

* * * * *